United States Patent [19]

Lewis et al.

[11] 4,300,919
[45] Nov. 17, 1981

[54] APPARATUS AND METHOD FOR DESORPTION OF GAS FROM A LIQUID

[75] Inventors: Geoffrey A. Lewis; Harry S. Bottoms, both of Solihull, England

[73] Assignee: Lucas Industries Limited, Birmingham, England

[21] Appl. No.: 98,048

[22] Filed: Nov. 28, 1979

[30] Foreign Application Priority Data

Dec. 6, 1978 [GB] United Kingdom ............... 47330/78

[51] Int. Cl.³ .............................................. B01D 19/00
[52] U.S. Cl. .......................................... 55/48; 55/55; 55/190; 261/36 R; 366/136
[58] Field of Search .............. 55/48, 52, 55, 189, 55/190, 201; 261/36 R, DIG. 75; 366/136, 137, 159

[56] References Cited

U.S. PATENT DOCUMENTS

| Re. 27,882 | 1/1974 | Burnham, Sr. ..................... 55/55 X |
| 2,577,797 | 12/1951 | Moyer ................................. 366/136 |
| 2,962,863 | 12/1960 | Caroli ................................. 55/190 X |
| 3,166,020 | 1/1965 | Cook ................................. 366/137 X |
| 3,273,313 | 9/1966 | Livesey et al. ..................... 55/190 X |
| 3,358,424 | 12/1967 | Magorien .......................... 55/189 X |
| 3,829,070 | 8/1974 | Reba et al. ..................... 261/36 R X |
| 4,207,180 | 6/1980 | Chang ............................. 261/36 R X |

FOREIGN PATENT DOCUMENTS

| 1142557 | 9/1957 | France ............................... 366/137 |
| 43671 | 2/1961 | Poland ................................... 55/55 |
| 1253540 | 11/1971 | United Kingdom. |
| 43671 | 2/1961 | Poland ................................... 55/55 |
| 1343772 | 1/1974 | United Kingdom. |
| 1343841 | 1/1974 | United Kingdom. |
| 1467810 | 3/1977 | United Kingdom. |
| 1517509 | 7/1978 | United Kingdom ............... 366/159 |

Primary Examiner—Robert H. Spitzer

[57] ABSTRACT

An apparatus for desorption of gas from a liquid comprises a chamber and a pump for circulating liquid from the chamber through an external system and returning this liquid to the chamber. A part of the liquid delivered by the pump is used to power an aspirator in the chamber, the aspirator recirculating liquid within the chamber, resulting in desorption of gas which collects within the chamber for removal by known means. The rate of recirculation through the aspirator, and hence the rate of gas desorption, is thus not limited to the rate of flow through the external apparatus.

6 Claims, 2 Drawing Figures

APPARATUS AND METHOD FOR DESORPTION OF GAS FROM A LIQUID

This invention relates to apparatus and methods for desorption of gas from liquid, and is particularly intended for removal of entrained and dissolved air from liquid which is to be used in a hydraulic system.

It is known to desorb gas from a liquid by subjecting the liquid to a substantial reduction in pressure and collecting the gas which separates as a result. It is common practice to provide that the pressure reduction is to a subatmospheric level.

It is known, for example from U.S. Pat. No. 3,273,313, to provide an aspirator for inducing the required pressure reduction, this aspirator being powered by pressurized fluid which is delivered by a hydraulic supply pump for an external hydraulic system. In the foregoing reference, however, though the aspirator discharges liquid to a storage tank, it does not also serve to draw liquid from this tank, but draws liquid from a return line connected to an external apparatus. The rate of desorption is thus limited by the rate of flow through the external apparatus.

It is an object of the present invention to provide a desorption apparatus in which the rate of desorption is not limited by external flow conditions.

According to the invention an apparatus for desorption of gas from a liquid comprises a first storage chamber for said liquid, a pump for withdrawing liquid from said chamber, an aspirator having a nozzle to which liquid can be delivered by said pump, an aspiration inlet communicating with said chamber, and an outlet, said outlet also communicating with said storage chamber, and means for supplying to said chamber the liquid from which gas is to be desorbed.

In a particular embodiment said means for supplying liquid to said first chamber comprises a second chamber communicating with said first chamber adjacent said aspiration inlet, and means for permitting liquid flow from said aspirator outlet to pass to said second chamber.

According to another aspect of the invention a method of desorbing a gas from a liquid comprises withdrawing said liquid from a reservoir by means of a pump, supplying part of the liquid delivered by said pump to the nozzle of an aspirator which can also withdraw liquid from said reservoir, and returning liquid which is discharged from said aspirator to said reservoir, whereby the rate of fluid flow through said aspirator is not limited to the rate of flow from said pump to an external circuit.

Embodiments of the invention will now be described by way of example only and with reference to the accompanying drawings in which.

Figure 1:
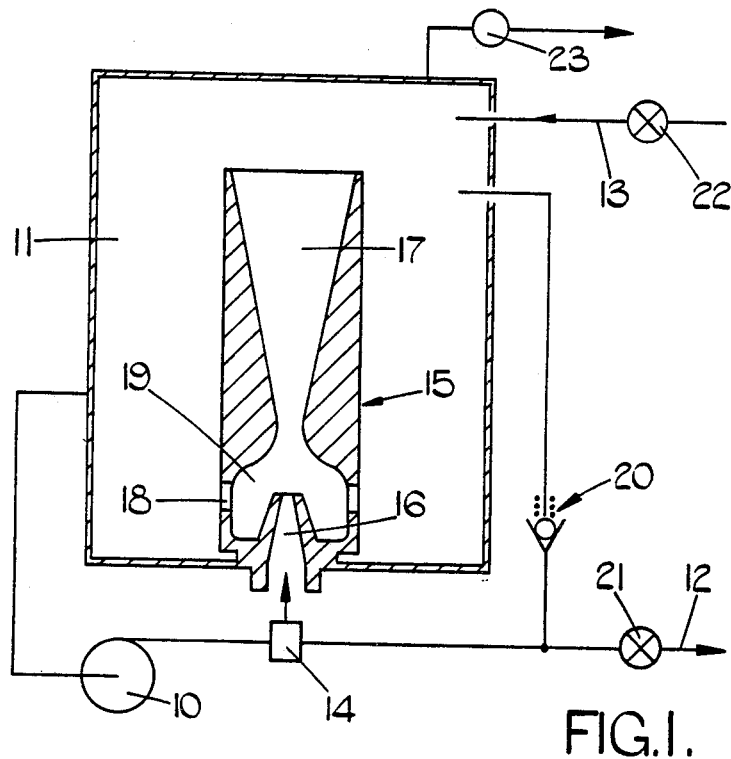
FIG. 1 shows, diagrammatically a desorption apparatus.

As shown in FIG. 1 a pump 10 can withdraw liquid from a storage chamber 11 and deliver this liquid through a line 12 to an external hydraulic system (not shown), liquid from the external system being returned to the upper end of the chamber 11 by way of a line 13. A pressure regulating valve 14 in the line 12 permits a part of the liquid delivered by the pump to be diverted to an aspirator 15 within the chamber 11.

The aspirator 15 includes a convergent nozzle 16 to which liquid is supplied at a pressure determined by the valve 14. The nozzle 16 is axially aligned with a divergent outlet 17 which is directed vertically upwardly into the chamber 11. The aspirator 15 includes a plurality of aspiration inlets 18 which are, as shown, adjacent the bottom of the chamber 11 and which open into a cavity 19 communicating with the outlet 17 and surrounding the nozzle 16.

The line 12 communicates with the chamber 11 by way of a pressure relief valve 20. Shut-off valves 21, 22 enable the arrangement to be isolated from the external hydraulic system.

The apparatus is intended for purging air from an external hydraulic system, for example that of an aircraft, and for desorbing air from hydraulic fluid within the external system. The lines 12, 13 are respectively connected to pressure and return connections of the external system and the pump 10 delivers hydraulic fluid from the chamber 11 to the external system from which it eventually returns to the chamber 11. The portion of the hydraulic liquid flowing through the nozzle 16 is reduced in pressure to a subatmospheric level, causing liquid in the cavity 19 to be entrained and similarly reduced in pressure and pass upwardly through the outlet 17. Liquid circulates within the tank, through the aspiration inlets 18, at a rate several times greater than that of the flow through the nozzle 16. Desorption of air from the liquid is thus very rapid and not dependent on the rate of flow through the external system, desorption continuing even if the valves 21, 22 are shut. Desorbed gas passes upwardly to the surface of liquid within the chamber 11 and is withdrawn by a vacuum pump 23 which maintains the chamber pressure subatmospheric.

A part of the gas within the fluid supplied through the line 13 will be desorbed as a result of its initial entry into the low pressure zone at the upper end of the chamber. The aspiration inlets 18, being adjacent the chamber bottom, thus receive liquid from which a proportion of the gas is already desorbed.

It is clearly desirable that the delivery pump should withdraw that part of the liquid from which the maximum amount of gas has already been desorbed. In conditions of rapid recirculation within the chamber 11 of FIG. 1, that is with the valves 21, 22 shut, liquid reaching the inlet of the delivery pump 10 may contain substantial quantities of entrained and dissolved air, thereby reducing the efficiency of the apparatus. The arrangement shown in FIG. 2 ensures that, in use the delivery pump receives liquid having a low air content.

Figure 2:
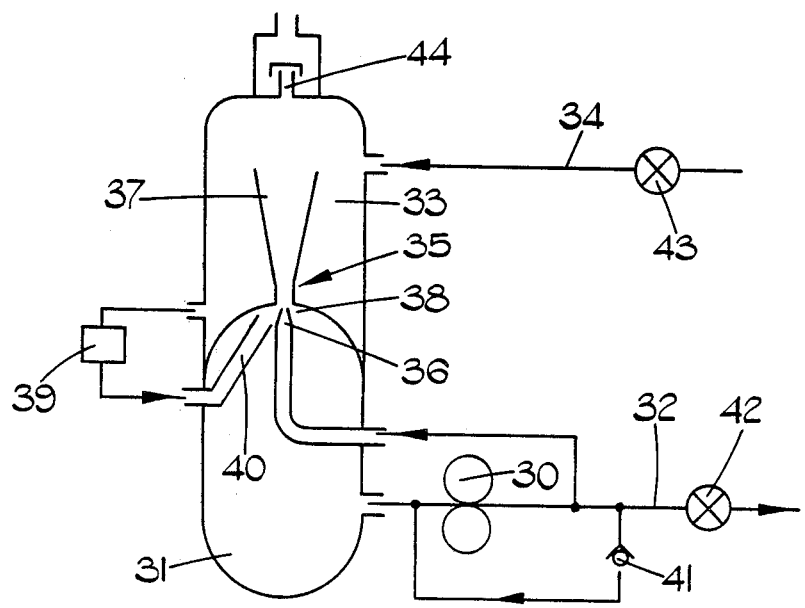
FIG. 2 shows, diagrammatically an alternative form of desorption apparatus.

As shown in FIG. 2 a supply pump 30 can draw liquid from a chamber 31 and deliver it to an external hydraulic system through a line 32. Liquid can be returned from the external system to a chamber 33 by way of a line 34. An aspirator 35 comprises a convergent nozzle 36 connected to receive liquid delivered by the pump 30. The aspirator 35 further includes a divergent outlet 37 from the chamber 31, the outlet 37 being aligned with the nozzle 36 and extending vertically upwardly into the chamber 33. An annular space 38 between the nozzle 36 and an adjacent end of the outlet 37 provides an aspiration inlet for liquid within the chamber 31.

The lower end of the chamber 33 communicates with the chamber 31 by way of a flow restricting valve 39 and a passage 40 which terminates adjacent the aspiration inlet 38. A relief valve 41 is connected across the pump 30 and shutoff valves 42, 43 in the respective lines 32, 34 enable the apparatus to be isolated from an external system. A vent valve 44 is provided at the upper end of the chamber 33. The inlet of the pump 30 communicates with the chamber 31 at a lower part thereof.

In use, the aspirator 35 draws liquid from the upper portion of the chamber 31, the pressure in chamber 31 being reduced to below atmospheric pressure. This pressure reduction causes liquid to be withdrawn from the chamber 33 and to pass to the upper end of chamber 31 through the valve 39 and passage 40. Liquid thus circulates continuously within the chambers 30, 31 through the aspirator 35. The low pressure maintained within the chamber 31 ensures that liquid in this chamber has a very low air content.

A part of the liquid leaving the passage 40 passes through the aspirator inlet 38, the remainder of this liquid passing eventually to the pump 30. The pump 30 thus withdraws liquid from the chamber 33, and returns part of this liquid to the chamber 33 by way external system.

What is claimed is:

1. A method of desorbing gas from a liquid, comprising withdrawing liquid from a storage chamber by means of a pump, supplying a part of the liquid discharged by said pump to the nozzle of an aspirator whose outlet communicates with said chamber and which has an aspiration inlet communicating with said outlet by way of said chamber, supplying the remainder of said liquid discharged by said pump to an external circuit, and returning said remainder of the liquid from said external circuit to said storage.

2. An apparatus for desorption of gas from a liquid, comprising a first storage chamber for said liquid, a pump for withdrawing liquid from said chamber, an aspirator having a nozzle to which liquid can be delivered by said pump, an aspiration inlet communicating with said chamber, and an outlet, said chamber providing a flow path through which liquid can flow from said outlet to said inlet, first and second passages through which liquid can flow in parallel from said pump to said aspirator nozzle and to an external circuit, means for supplying to said chamber liquid returned from said external circuit, said means for supplying liquid to said first chamber comprising a second chamber communicating with said first chamber adjacent said aspirator inlet, and means for permitting liquid flow from said aspirator to pass from said first chamber to said second chamber.

3. An apparatus as claimed in claim 2 which includes a further pump for removing desorbed gas from said chamber.

4. An apparatus as claimed in claim 2 or claim 3 in which said aspiration inlet is adjacent the bottom of said chamber and said means for supplying the liquid communicates with an upper portion of said chamber.

5. An apparatus as claimed in claim 2 in which said aspirator outlet is divergent in the direction of flow therethrough and its smaller flow cross-section opens into said second chamber, said aspirator inlet being defined by a space between said smaller flow cross-section and said nozzle, and in which there is provided a passage communicating with said first chamber and extending to a location in said second chamber adjacent said aspirator inlet.

6. An apparatus as claimed in claim 5 which includes a flow restriction in said passage.

* * * * *